US006866423B2

(12) United States Patent
Faltus et al.

(10) Patent No.: US 6,866,423 B2
(45) Date of Patent: Mar. 15, 2005

(54) ROLLER BEARING

(75) Inventors: Barbara Faltus, Gochsheim (DE); Werner Göbel, Poppenhausen (DE); Günter Neder, Schweinfurt (DE); Armin Olschewski, Schweinfurt (DE)

(73) Assignee: AB SKF, Gothenburg (SE)

( * ) Notice: Subject to any disclaimer, the term of this patent is extended or adjusted under 35 U.S.C. 154(b) by 0 days.

(21) Appl. No.: 10/267,567

(22) Filed: Oct. 10, 2002

(65) Prior Publication Data

US 2003/0086631 A1 May 8, 2003

(30) Foreign Application Priority Data

Oct. 10, 2001 (DE) .................................. 201 16 649 U

(51) Int. Cl.[7] .......................... F16C 43/04; F16C 25/00
(52) U.S. Cl. ..................... 384/559; 384/500; 384/571
(58) Field of Search ................................. 384/447, 499, 384/500, 501, 502, 504–506, 510, 513, 548, 559, 570, 571

(56) References Cited

U.S. PATENT DOCUMENTS 3,081,135 A * 3/1963 Olson .......................... 384/501
3,967,867 A * 7/1976 Richardson .................. 384/582
4,771,199 A * 9/1988 Johannes ..................... 384/571
4,784,438 A    11/1988 Fikse
4,878,769 A * 11/1989 Schepp ....................... 384/571

FOREIGN PATENT DOCUMENTS

| DE | 1 929 815    | 12/1965 |
| DE | 73 38 366 U1 | 2/1974  |
| DE | 27 24 849 A1 | 12/1978 |
| DE | 28 29 678 A1 | 1/1980  |
| DE | 26 48 144 C2 | 7/1984  |
| DE | 37 01 397 A1 | 7/1988  |
| DE | 197 46 987 C2| 3/2001  |
| FR | 648332       | 7/1928  |
| JP | 02-304210    | 12/1990 |

* cited by examiner

Primary Examiner—Thomas R. Hannon
(74) Attorney, Agent, or Firm—Burns, Doane, Swecker & Mathis, L.L.P.

(57) ABSTRACT

A roller bearing includes at least one inner ring and at least one outer ring, with at least one of the inner and outer rings being comprised of at least four segments. In addition, at least one of the segments is provided with a mechanism for moving the segment in the radial direction. This radial setting mechanism can be in the form of a cam that functions between the segment and a housing accommodating the segment.

20 Claims, 3 Drawing Sheets

ROLLER BEARING

This application is based on and claims priority under 35 U.S.C. § 119 with respect to German Application No. 201 16 649.6 filed on Oct. 10, 2001, the entire content of which is incorporated herein by reference.

FIELD OF THE INVENTION

The present invention generally relates to a bearing. More particularly, the invention pertains to a roller bearing having at least an outer ring and at least an inner ring, with at least one of the rings being formed by segments.

BACKGROUND OF THE INVENTION

A bearing having at least an outer ring and at least an inner ring, with at least one of the rings being formed by segments, is known. An example of such a segment bearing is disclosed in German Utility Model No. 73 38 366 U1. In this disclosed segment bearing, the inner ring and/or the outer ring are each made of two semicircular bearing segments. These bearing segments are positioned and fixed in a suitable support housing, thereby resulting in a largely undisturbed operation of the roller bearing. To set and fix the two cooperating bearing segments that together form a ring bearing, screws and screw nuts are provided and are placed between the housing and the bearing segments.

When used in modern wind power plants, bearings whose rings are several meters in diameter and are correspondingly heavy have proven problematic to mount as well as to repair, if necessary. Starting from a certain bearing diameter, the rings become very difficult to handle and are difficult to manage even with special cranes. In some applications of wind power plants, a bearing arrangement with two single-row bearings is used. Sometimes, this bearing arrangement cannot be repaired and replaced directly on the mast. Rather, it is usually necessary to take the plant apart if the bearing arrangement needs to be changed.

The 20-year usable life to which manufacturers and operators of wind plant plants aspire typically cannot be achieved without changing the bearing. Consequently, it is necessary to use expensive cranes if the bearing arrangement needs to be replaced directly on the mast. In addition, the heavy rotor of the wind power plant must be supported against being lifted off due to high wind power during dismantling of the bearing arrangement. This involves relatively high costs.

A need thus exists for a bearing of the type mentioned above which makes it possible to carry out a relatively simple mounting of the bearing, even in ring bearings with very large diameters, and to also set the bearing with relatively great precision. Furthermore, a need exists for such a bearing which can be repaired in a relatively simple manner in the bearing arrangement of large wind power plants.

SUMMARY OF THE INVENTION

According to one aspect of the invention, a roller bearing includes at least one inner ring and at least one outer ring, with at least one of the inner and outer rings being comprised of at least four segments. In addition, at least one of the segments is provided with means for moving the at least one segment in a radial direction.

By providing at least four segments per ring bearing, in combination with the means for radial adjustment, very large bearings, particularly those used in wind power plants, may be mounted in a relatively simple manner while also being capable of being repaired through replacement of individual segments. With respect to the design and maintenance or repair of a bearing of a wind power plant, this arrangement is quite advantageous and addresses a number of the problems known today. The segment bearing may be individually set, replaced, and maintained with respect to radial and axial play, and so disassembly of the entire bearing is not necessary. Also, the bearing replacement work may be done directly on the mast of the wind power plant. In particular, no special measures for securing the rotor of the wind power plant are necessary; and the shaft of the rotor remains fixed when individual segments are replaced.

The outer ring as well as the inner ring are each preferably comprised of at least four segments. The means for effecting the radial setting of the bearing segments can be in the form of a cam that functions between the segment and a housing accommodating the segment. Each segment preferably has separate means for setting the radial direction.

The cam may, in the axial direction of the bearing, penetrate the housing accommodating this. Furthermore, the housing can be configured to enclose the inner or outer ring laterally and on the side opposite the track of the inner or outer ring.

The cam is also advantageously provided with a mechanism for turning the cam, with the mechanism being arranged outside of the housing which accommodates the segments. his mechanism can also function in combination with a dial on which the resultant radial setting of the segment can be read.

Through adjustment, bearing play as well as misalignment between the inner and outer housing may be compensated. If the bearing in question is used in a wind power plant, the gap between the rotor and stator of the generator may be set, thus allowing improvement in the performance of the generator.

Additionally, a gap can advantageously be provided in the mounted state of the bearing between the lateral outer surface of one of the inner or outer rings and the lateral inner surface of the housing.

With this roller bearing, a large bearing can be created which can be mounted in a relatively simple manner and, if necessary, repaired even when the bearing rings have very large diameters. To achieve this, the bearing only needs to be turned to a position in which the bearing segment to be changed is unscrewed from the load zone. Afterwards, the bearing segment can be dismantled, with a new bearing segment mounted and placed in its required, exact, final position using the radial setting means.

BRIEF DESCRIPTION OF THE DRAWING FIGURES

The foregoing and additional features and characteristics of the present invention will become more apparent from the following detailed description considered with reference to the accompanying drawing figures in which like reference numerals designate lie elements.

DETAILED DESCRIPTION

Figure 3:
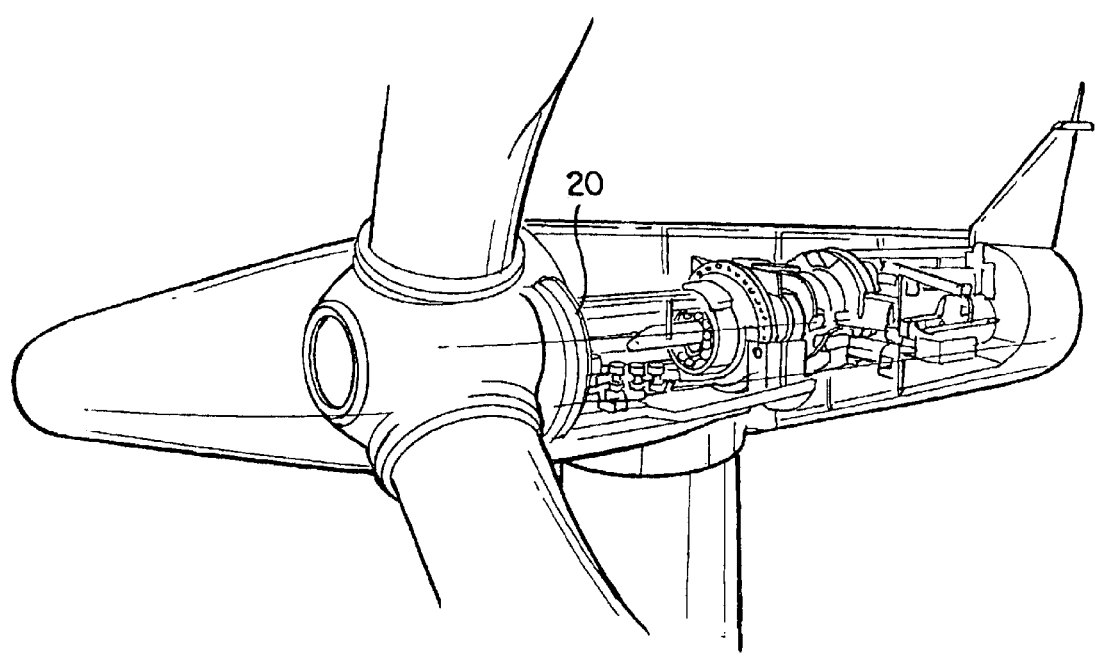
FIG. 3 is a general illustration of a portion of a wind power plant in which the arrangement shown in FIG. 1 can be employed.

The drawing figure illustrates a roller bearing for a bearing arrangement of a rotor of a large wind power plant. FIG. 3 illustrates a portion of a wind power plant in which a bearing arrangement incorporating the roller bearing 20 described here can be employed.

Figure 1:
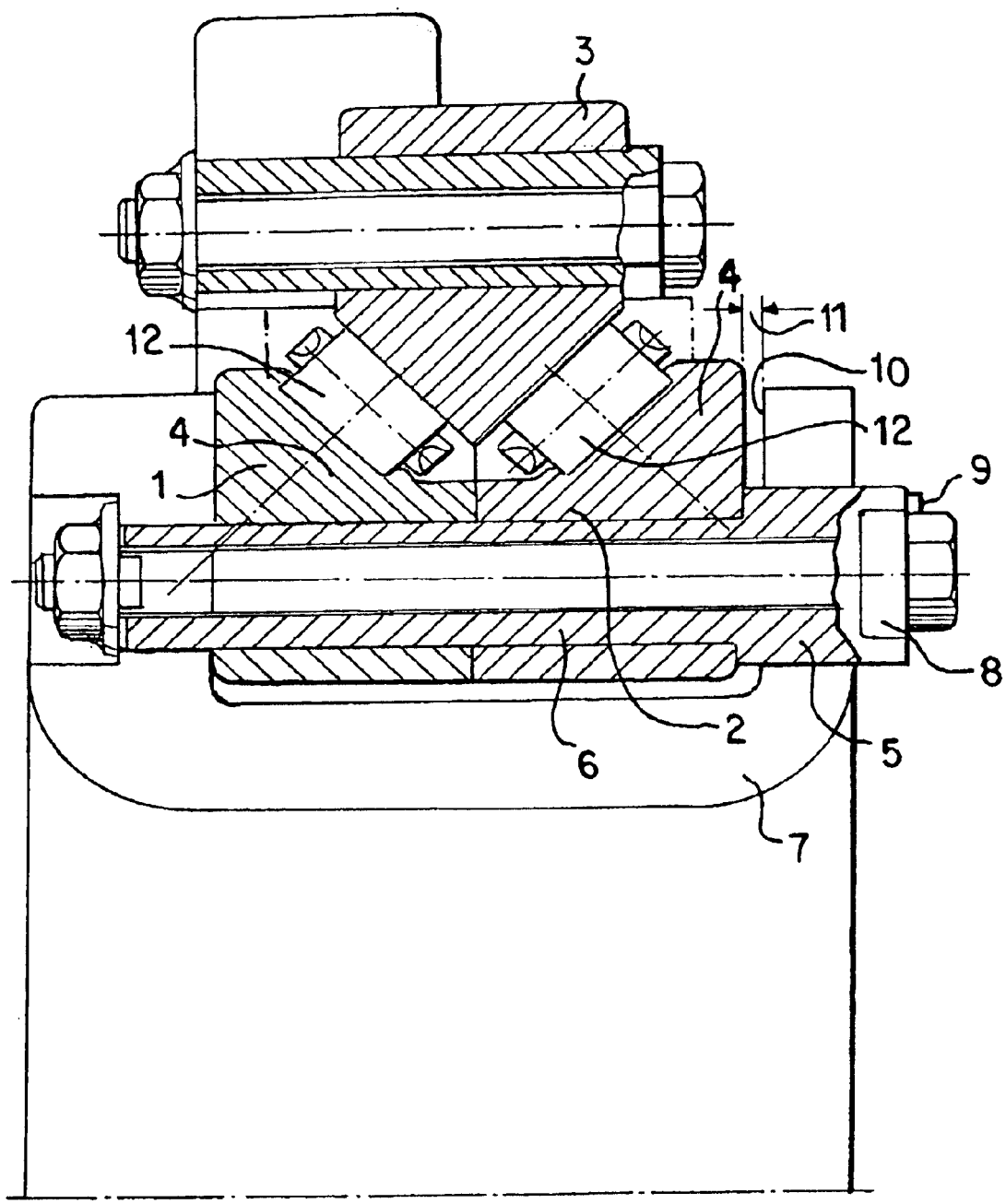
FIG. 1 is a radial cross-section through a part of a large bearing for a wind power plant, including a schematic illustration of the housing surrounding the inner ring.
Figure 2:
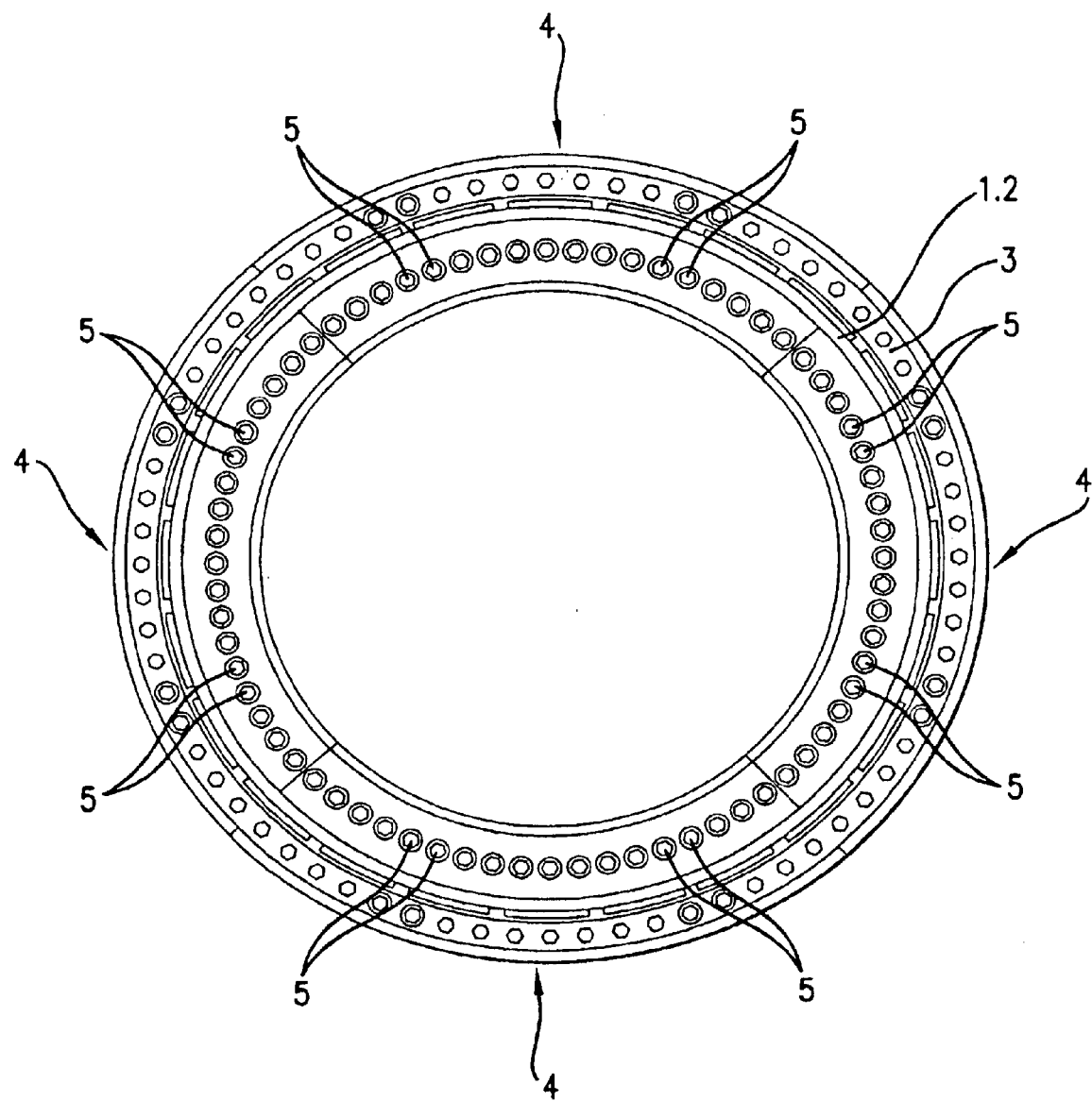
FIG. 2 is an end view of the arrangement shown in FIG. 1 illustrating the inner and outer rings comprised of plural segments each provided with a separate radial setting device.

The roller bearing is comprised of a two-piece inner ring 1, 2 and an outer ring 3. Slightly conical roll bodies 12 are arranged between the two-piece inner ring 1, 2 and the outer ring 3. The outer ring 3 and the inner ring 1, 2 can be provided with respective tracks for receiving the roll bodies 12. Each of the three rings 1, 2, 3 can be made of four segments 4, each of which forms a circumferential section of 90°. Such an arrangement is shown in FIG. 2.

To effect a relatively accurate radial setting of the segment 4, a radial setting mechanism 5 is provided. The radial setting mechanism 5 is in the form of a cam pin comprised of a pin provided with a cam (eccentric cam) 6. The cam pin 5 is arranged in a housing 7. The cam 6 thus operates between the segment 4 and the housing 7. As shown in FIG. 2, it is possible to provide a radial setting mechanism 5 for each of the segments 4 to move the segments 4 in the radial direction. The cam 6 can be turned or rotated using a device 8 for turning. In the illustrated embodiment, the device 8 for turning is a screw head that is fixed on the cam pin 5. A suitable tool can be used to engage and turn this screw head, thus causing rotation of the cam pin 5. Thus, by turning or rotating this screw head 8, the segments 4 of the inner ring 1, 2 are moved in the radial bearing direction to produce the desired radial setting of the segments 4. The turning device 8 is operated from outside the housing 7 or is arranged outside the housing 7.

By way of a dial 9, which is illustrated quite schematically in the drawing figure, a marking on the side of the housing 7 can be utilized to indicate that the desired radial feed motion has been reached. More specifically, the cam pin 5 formed with or connected to the eccentric cam 6 is provided with a dial 9 intended to indicate, by way of suitable markings on the housing 7, the desired radial setting. Thus, by rotating the cam pin 5, the dial or indicator 9 points to an appropriate marking on the housing 7, by way of which the radial setting can be adjusted.

In the illustrated embodiment, the housing 7 possesses a U-shaped longitudinal cross-section. The housing 7 thus encloses the segments of the two parts or pieces 1, 2 forming the inner ring. A gap 11 is provided between the lateral or axially inwardly facing inner surface 10 of the housing 7 and the lateral or axially outwardly facing side face of the inner ring 2 (i.e., the side face shown on the right in the drawing figure). The gap 11 makes it possible, by loosening the screw in the cam pin 5, to axially displace the cam 6 and the segment 4 of the inner ring 2 until it is possible to remove a bearing segment 4. That is, the screw fixing the cam pin 5 can be loosened and the cam pin 5 moved axially to the right. By virtue of the gap 11, the right segment 4 can also be axially moved. A certain clearance is thus produced to disassemble the single parts of the bearing, i.e., the segments 4 of the inner and outer bearing ring. Damaged segments can then be replaced. The assembly of the arrangement is done by the reverse order of the disassembly steps. Thus, this arrangement makes it possible, after loosening the screw of an outer ring segment, to axially displace the segment until it can be taken out of the centering in the housing 7 and consequently removed radially outwards. After removing an outer ring segment, the inner ring segment can likewise be removed. New segments 4 can then be installed in an appropriate manner.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A roller bearing comprising:
   at least one inner ring;
   at least one outer ring;
   at least one of the inner and outer rings being comprised of at least four segments;
   at least one of the segments including means for moving the at least one segment in a radial direction.

2. The roller bearing according to claim 1, wherein the inner ring is comprised of at least four segments and the outer ring is comprised of at least four segments.

3. The roller bearing according to claim 2, wherein the means for moving the at least one segment in a radial direction includes a cam operating between the at least one segment and a housing in which the at least one segment is accommodated.

4. The roller bearing according to claim 3, wherein each segment of the inner ring includes a separate means for moving the segment in a radial direction.

5. The roller bearing according to claim 4, wherein the cam, in an axial direction of the bearing, penetrates the housing.

6. The roller bearing according to claim 5, wherein the inner ring and the outer ring include a track for roll bodies, the housing laterally enclosing the inner ring or the outer ring on a side opposite the track.

7. The roller bearing according to claim 6, wherein the cam includes means for turning the cam, the mean for turning being arranged outside the housing.

8. The roller bearing according to claim 7, wherein the means for turning operates in combination with a dial indicating a radial setting of the segments.

9. The roller bearing according to claim 8, including a gap between a lateral outer surface of one of the inner or outer rings and a lateral inner surface of the housing.

10. The roller bearing according to claim 9, wherein the roller bearing is arranged in a wind power plant.

11. The roller bearing according to claim 1, wherein the means for moving the at least one segment in a radial direction includes a cam operating between the at least one segment and a housing in which the at least one segment is accommodated.

12. The roller bearing according to claim 1, wherein each segment includes a separate means for moving the segment in a radial direction.

13. The roller bearing according to claim 1, wherein the at least one segment is located in a housing, the inner ring and the outer ring including a track receiving roll bodies, the housing laterally enclosing the inner ring or the outer ring on a side opposite the track.

14. The roller bearing according to claim 1, wherein means for moving the at least one segment in a radial direction comprises a cam, the cam including means for turning the cam.

15. The roller bearing according to claim 14, wherein the means for turning operates in combination with a dial indicating a radial setting of the at least one segment.

16. The roller bearing according to claim 1, wherein the inner ring includes a plurality of segments, the segments being located in a housing, and including a gap between a lateral outer surface of the inner ring and a lateral inner surface of the housing.

17. A roller bearing comprising:

at least one inner ring;

at least one outer ring;

a plurality of rolling bodies arranged between the at least one inner ring ands the at least one outer ring;

at least one of the inner and outer rings being comprised of a plurality of segments arranged in a housing;

a rotatable pin passing through the housing and provided with a cam to move at least one of the segments in a radial direction.

18. The roller bearing according to claim 17, wherein the pin includes means for turning the pin to rotate the cam.

19. The roller bearing according to claim 18, wherein the means for turning the pin operates in combination with a dial indicating a radial setting of the at least one segment.

20. The roller bearing according to claim 17, wherein the inner ring includes four segments located in the housing, and including a gap between a lateral outer surface of the segments of the inner ring and a lateral inner surface of the housing.

* * * * *